Patented Mar. 5, 1940

2,192,456

UNITED STATES PATENT OFFICE 2,192,456

SILVER SOLDER ALLOY

Johann S. Streicher, Newark, N. J., assignor to American Platinum Works, Newark, N. J., a corporation of New Jersey No Drawing. Application October 26, 1939, Serial No. 301,378

2 Claims. (Cl. 75—173)

This application is a continuation in part of my co-pending application filed March 20, 1939, under Serial #263,048.

This invention relates in general to silver alloys and more particularly to silver alloys suitable for soldering or brazing operations.

Silver solders in general use are based on the ternary silver-copper-zinc eutectic alloy having a flow point of about 680° C. which in the easy flowing silver solder alloys is lowered to about 640° C. by the addition of cadmium, and the silver solders most generally used thus comprise approximately 50% of silver; substantially equal parts of copper and zinc, and about 14%–18% cadmium. Such solders are yellowish in color and have a further disadvantage in that the high vapor tension of the cadmium causes it to distill from the solder during the soldering operation at the melting point as well as at temperatures within 100° C. of its flow point, producing a change in the mechanical and electrical properties and in the color of the alloy.

It is one object of the invention to produce a silver alloy particularly suitable for use as a silver solder, having a high silver content, high corrosion resistance and high tensile strength, while at the same time having a low melting point and a short melting range, enabling the alloys to flow freely and quickly when used as solders at the usual soldering temperatures and permitting such alloys to be used in producing strong solder joints at low temperatures with a minimum of heat.

It is a further object of the invention to produce a silver solder having a substantially white color and in which the distillation of the cadmium is substantially prevented.

I have found that the melting point of the silver-copper-zinc eutectic which forms the base of silver solders can be lowered by incorporating therein up to 7% tin.

The alloys are practically white, similar in color to platinum or palladium, particularly when they have a high tin content; they are, therefore, especially useful for soldering white metals, such as nickel, or Monel metal. The mechanical properties are as good as those of all the other low melting silver solders. Their chemical properties, such as corrosion resistance, are superior to the solders in use and having a high cadmium content. Since the new silver solders melt with a melting range of approximately 20° C. at the extremely low flow points of 630° C. respectively 640° C. they flow freely on any metal with which silver solders are used.

My alloys are best used in connection with fluxes having a melting point below or close to the melting point of the solder. In cases where the use of fluxes is limited I can obtain very effective solder joints when I add minor quantities of manganese or phosphorous to my alloys, for instance in quantities between 0.2% and 2%. The addition of up to 2% manganese has the further advantage that while the flow point remains practically unaffected the melting range is reduced to about 5° C., thus furnishing extremely quickly flowing solders. Phosphorous and manganese act as deoxidizers during the soldering operation, and the presence thereof in quantities up to 2% shall not be excluded from the scope of the appended claims.

Specific embodiments of my invention comprise:

(1) An alloy of—

| | Percent |
|---|---|
| Silver | 56 |
| Zinc | 17 |
| Copper | 22 |
| Tin | 5 | having a melting range of 650° C. to 630° C.

The alloys may contain from approximately 48% to 56% silver, and from approximately 20% to 22% copper, and from approximately 16% to 22% zinc, together with from approximately 1% to 7% tin, preferably up to about 5% tin.

The alloys according to my invention should be substantially free from other substances, but may contain small quantities of other substances so long as the fundamental characteristics of my solder alloys are not substantially altered in a detrimental manner.

The foregoing disclosure is to be regarded as descriptive and illustrative only, and not as restrictive or limitative of the invention, of which obviously embodiments may be considered, without departing from the general scope herein indicated and denoted in the appended claims.

Having thus described my invention, what I claim as new and desire to secure by Letters Patent, is:

1. A silver solder alloy comprising approximately 48% to 56% silver, approximately 20% to 22% copper, approximately 16% to 22% zinc, and approximately 1% to 7% tin.

2. A silver solder alloy which comprises approximately 56% silver, 22% copper, approximately 17% zinc and approximately 5% tin.

JOHANN S. STREICHER.